2,903,393
DIETHYLAMINE ADDITION PRODUCTS OF ACID PHOSPHATES

George Jackson Allen and Robert Carryll Parsons, Richmond, Va., assignors to Virginia-Carolina Chemical Corporation, Richmond, Va., a corporation of Virginia No Drawing. Application January 17, 1958
Serial No. 709,450

8 Claims. (Cl. 167—30)

This invention relates to new chemical compounds and to a method of controlling nematodes in the soil with these compounds. Specifically, this invention relates to the new diethylamine addition products of two acid phosphates and their mixtures. The acid phosphates are octylphenyl dihydrogen phosphate and bis(octylphenyl) hydrogen phosphate. The diethylamine addition products are represented by the formulas

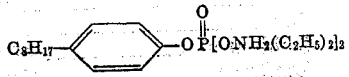

and

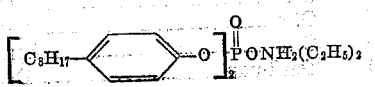

These two compounds are embraced by the general formula

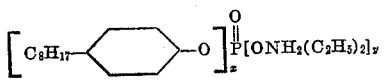

in which $x$ and $y$ each represents one of the numerals 1 and 2 and the sum of $x$ and $y$ is 3.

Methods of preparation of the above named compounds are shown in the following examples.

EXAMPLE I

*Preparation of octylphenyl dihydrogen phosphate diethylamine salt*

15.0 parts of 100% pure octylphenyl dihydrogen phosphate and 100.0 parts of methanol were placed in a reaction vessel equipped with a thermometer, stirrer, addition funnel and reflux condenser. The mixture was stirred and 15.0 parts of diethylamine was added over a five minute period while the temperature within the reaction vessel was maintained at 20° C. by means of an ice-water bath. The mixture was stirred for one hour at room temperature. The reaction mixture was then transferred to a stripping apparatus and the methanol and excess amine were removed by distillation to a temperature of 55° C. at a pressure of approximately 25 mm. Hg. The product analyzed 7.22% phosphorus and 5.20% nitrogen. Theoretical values for phosphorus and nitrogen are 7.15% and 6.48% respectively. The melting point of the product was 158–162° C.

EXAMPLE II

*Preparation of bis(octylphenyl) hydrogen phosphate diethylamine salt (2)*

100.0 parts of 100% pure bis(octylphenyl) hydrogen phosphate and 87.9 parts of benzene were placed in a reaction vessel equipped with a thermometer, stirrer, addition funnel and reflux condenser. 15.4 parts of diethylamine was added slowly to the stirred reaction mixture while the temperature was maintained at 35° C. After the addition of the amine was completed the mixture was heated to 60° C. for 30 minutes. The reaction mixture was then transferred to a stripping apparatus and the benzene removed by distillation to a temperature of 95° C. at a pressure of approximately 25 mm. Hg. 123.3 parts of bis(octylphenyl) hydrogen phosphate diethylamine salt was obtained which had a melting point of 95–100° C. The product analyzed 5.21% phosphorus and 2.81% nitrogen. Theoretical values for phosphorus and nitrogen are 5.65% and 2.56%.

EXAMPLE III

*Preparation of mixture of diethylamine salts of bis(octylphenyl) hydrogen phosphate and octylphenyl dihydrogen phosphate*

379.9 parts of mixed octylphenyl acid phosphates obtained by the reaction of three moles of octylphenol with one mole of phosphorus pentoxide and 122.5 parts of benzene were placed in a reaction vessel equipped with a stirrer, thermometer, dropping funnel and a reflux condenser fitted with a moisture trap. The mixture was heated to 70° C. and held at that temperature until the acid phosphates dissolved. 109.7 parts of diethylamine was then added over a period of two hours to the stirred reaction mixture. The temperature was maintained between 65–75° C. After the addition of the amine was completed, the mixture was held at a temperature of between 65° C. and 75° C. for four hours. The product, after removal of the benzene, was an orange-colored, very sticky solid.

The octylphenyl phosphates used in Examples I and II can be made by the hydrolysis of the corresponding phosphorochloridates. A method of preparing the phosphorochloridates is presented in U.S. Patent 2,071,017, S. L. Bass, which was issued February 16, 1937. The subsequent hydrolysis of these compounds to the corresponding acid phosphates is a straight forward operation and a general description may be found in Organophosphorus Compounds; Kosolapoff, G. M.; p. 223; 1950.

The three products obtained in Examples I, II and III are useful as nematocides. When tested in a greenhouse test for nematocidal activity, they showed good control of root knot nematodes. The following is a description of the greenhouse test for nematocidal activity:

Soil infested with root-knot nematodes is taken from the box wherein the nematode culture is maintained. Enough of this soil is used to fill a four-inch diameter clay pot. This soil is placed in a metal tray and an emulsion of the test chemical is thoroughly worked into the soil. This treated soil is replaced in the four-inch pot and remains in the greenhouse for two weeks. During this time the pot receives normal greenhouse watering. After the two-week period, tomato seedlings are transplanted into five two-inch diameter pots which are filled with the infested soil which has been treated with the test chemical. The tomato plants are allowed to grow for five weeks and then observations are made to detect the degree of root-knot control. To do this, the plants are removed from the soil, the roots washed with water, and then cut away from the plant. The activity of the test compound is evaluated by counting the number of knots in two grams of roots. The results are reported with the following code:

A = no knots on 2 g. of roots
B = 1–10 knots on 2 g. of roots
C = 11–20 knots on 2 g. of roots
D = 21–30 knots on 2 g. of roots
E = 31–40 knots on 2 g. of roots A rating of C or above indicates that the compound has good nematocidal activity.

The following table shows the results on the products obtained in Examples I, II and III when tested at various application rates in the above described test.

| Compound Tested | Application Rate (lbs./acre) | | | |
|---|---|---|---|---|
| | 500 | 250 | 125 | 62.5 |
| Product of Example I | A | B | C | E |
| Product of Example II | A– | B | B | C |
| Product of Example III | C | B | B | B– |
| Untreated | E | E | E | E |

It thus appears that each of the products has good nematocidal activity at least down to application rates of 125 lbs./acre.

We claim:

1. A compound of the general formula

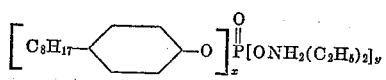

in which $x$ and $y$ each represents one of the numerals 1 and 2 and the sum of $x$ and $y$ is 3.

2. The diethylamine addition product of octylphenyl dihydrogen phosphate.

3. The diethylamine addition product of bis(octylphenyl) hydrogen phosphate.

4. The diethylamine addition product of a mixture of octylphenyl dihydrogen phosphate and bis(octylphenyl) hydrogen phosphate obtained as the reaction product of three moles of octylphenol with one mole of phosphorus pentoxide.

5. Method of controlling nematodes in the soil which comprises applying thereto a compound of the general formula

[C_8H_{17}—⟨⟩—O]_x P(=O)[ONH_2(C_2H_5)_2]_y in which $x$ and $y$ each represents one of the numerals 1 and 2 and the sum of $x$ and $y$ is 3.

6. Method as defined in claim 5 in which the compound is the diethylamine addition product of octylphenyl dihydrogen phosphate.

7. Method as defined in claim 5 in which the compound is the diethylamine addition product of bis(octylphenyl) hydrogen phosphate.

8. Method as defined in claim 5 in which the compound is the diethylamine addition product of a mixture of octylphenyl dihydrogen phosphate and bis(octylphenyl) hydrogen phosphate obtained as the reaction product of three moles of octylphenol with one mol of phosphorus pentoxide.

References Cited in the file of this patent

UNITED STATES PATENTS

| 2,341,657 | Rosenmund | Feb. 15, 1944 |
| 2,375,626 | Cook | May 9, 1945 |
| 2,403,762 | Smith | July 9, 1946 |
| 2,403,763 | Smith | July 9, 1946 |
| 2,508,430 | Smith et al. | May 23, 1950 |
| 2,725,394 | Zenftman | Nov. 29, 1955 |
| 2,745,863 | Otto | May 15, 1956 |
| 2,790,765 | Otto | Apr. 30, 1957 |
| 2,790,766 | Otto | Apr. 30, 1957 |
| 2,815,324 | Zenftman | Dec. 3, 1957 |

UNITED STATES PATENT OFFICE

Certificate of Correction

Patent No. 2,903,393 September 8, 1959

George Jackson Allen et al.

It is hereby certified that error appears in the printed specification of the above numbered patent requiring correction and that the said Letters Patent should read as corrected below.

Column 4, lines 3 to 5, extreme right-hand portion of the formula, for "$(C_2H_5)_2]_y$." read —$(C_2H_5)_2]_y$—.

Signed and sealed this 22nd day of March 1960.

[SEAL]

Attest:
KARL H. AXLINE,
*Attesting Officer.*

ROBERT C. WATSON,
*Commissioner of Patents.*